United States Patent
Li et al.

(10) Patent No.: US 11,232,630 B2
(45) Date of Patent: Jan. 25, 2022

(54) SYSTEMS AND METHODS FOR TERRAIN MODIFICATION AT RUNTIME USING DISPLACEMENT MAPPING

(71) Applicant: Cesium GS, Inc., Philadelphia, PA (US)

(72) Inventors: Kangning Li, North Wales, PA (US); Sean Lilley, Exton, PA (US)

(73) Assignee: CESIUM GS, INC., Philadelphia, PA (US)

( * ) Notice: Subject to any disclaimer, the term of this patent is extended or adjusted under 35 U.S.C. 154(b) by 0 days.

(21) Appl. No.: 17/230,652

(22) Filed: Apr. 14, 2021

(65) Prior Publication Data

US 2021/0327131 A1  Oct. 21, 2021

Related U.S. Application Data

(60) Provisional application No. 63/010,143, filed on Apr. 15, 2020.

(51) Int. Cl.
| | |
|---|---|
| *G06T 17/05* | (2011.01) |
| *G06T 19/00* | (2011.01) |
| *G06T 17/20* | (2006.01) |
| *G06T 15/04* | (2011.01) |

(52) U.S. Cl.
CPC ............. *G06T 17/05* (2013.01); *G06T 15/04* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 2008/0018647 A1* | 1/2008 | Bunnell | G06T 13/00 345/426 |
| 2014/0267279 A1* | 9/2014 | Kontkanen | G06T 17/05 345/427 |
| 2016/0148418 A1* | 5/2016 | Cooper | G06T 19/00 348/51 |
| 2017/0039765 A1* | 2/2017 | Zhou | G06T 7/55 |

* cited by examiner

*Primary Examiner* — Tize Ma
(74) *Attorney, Agent, or Firm* — The Marbury Law Group, PLLC

(57) ABSTRACT

Systems, methods, devices, and non-transitory media of the various embodiments may include encoding localized terrain modifications into one or more heightmaps, which are used to modify the vertices of the world-wide terrain map at runtime using a Graphics Processing Unit (GPU). Various embodiments apply displacement to dynamic terrain surfaces, such as time dynamic surfaces, animated surfaces, Hierarchical Level-of-Detail (HLOD) surfaces, and surfaces suitable for interactive user editing, at a global scale.

12 Claims, 17 Drawing Sheets

SYSTEMS AND METHODS FOR TERRAIN MODIFICATION AT RUNTIME USING DISPLACEMENT MAPPING

RELATED APPLICATIONS

This application claims priority to U.S. Provisional Application No. 63/010,143 entitled "Systems and Methods For Terrain Modification At Runtime Using Displacement Mapping" filed on Apr. 15, 2020, the entire contents of which are hereby incorporated by reference for all purposes.

BACKGROUND

Computer graphics, and especially three-dimensional (3D) visualization, is a rapidly developing computing technology finding new applications in many different industries, including geospatial, defense, entertainment, and construction.

3D Digital Earth and Geographic Information System (GIS) software often includes the ability to render models of terrain as a map of heights of the Earth's surface. Such large-area terrain models are desirable because they provide global context even for applications that are primarily concerned with localized (within several kilometers) areas. However, integrating localized, rapidly changing terrain, such as terrain changes in an earthworks project spanning weeks or months, into these large-area terrain models by updating the world-wide map with this information may be impractical for a variety of reasons, including speed, cost, or a lack of control of a centralized world-wide map in the case of web-based systems.

SUMMARY

The systems, methods, devices, and non-transitory media of the various embodiments enable local terrain to be applied as a modification to a world-wide map at runtime. Various embodiments may reduce the preprocessing cost and sharing concerns associated with updating the entire world-wide map in conventional systems. Various embodiments may allow for rapid switching between versions of the localized terrain. Various embodiments include encoding localized terrain modifications into one or more heightmaps, which are used to modify the vertices of the world-wide terrain map at runtime using a Graphics Processing Unit (GPU). Various embodiments apply displacement to dynamic terrain surfaces, such as time dynamic surfaces, animated surfaces, Hierarchical Level-of-Detail (HLOD) surfaces, and surfaces suitable for interactive user editing, at a global scale.

Various embodiments may include a method for terrain modification at runtime for display of a base terrain map, wherein the base terrain map is a triangle mesh having a series of base tiles, each base tile of the series of base tiles corresponding to its own latitude and longitude defined tile rectangular area and each base tile of the series of base tiles having vertices that define their respective heights relative to a reference height source, the method including receiving a local terrain update, wherein the local terrain update comprises a series of height samples in a grid covering a local terrain tile that has a latitude and a longitude defining a rectangular area to be updated by the local terrain update, packing the local terrain update into one or more graphics processing unit (GPU) textures, wherein each GPU texture covers a non-overlapping area of longitude and latitude, and at runtime for rendering the base terrain map on a display, determining which base tiles of the series of base tiles are to be displayed and that overlap the local terrain tile in longitude and latitude, computing the local terrain tiles' rectangular coordinates mapped into rectangular coordinates of any determined overlapping base tiles such that each GPU texture is mapped into a determined overlapping base tile, and modifying a vertex of any determined overlapping base tiles along a normal by a height difference between the vertex and a corresponding mapped point in the local terrain tile.

Various aspects include a device including a processor configured with processor-executable instructions to perform operations of any of the methods summarized above. Various aspects also include a non-transitory processor-readable medium on which is stored processor-executable instructions configured to cause a processor of a device to perform operations of any of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs. Computing devices may include more than one type of processor. For example, a computing device may include a central processing unit (CPU) and a graphics processing unit (GPU). A CPU typically includes a limited number of cores with relatively larger cache memory capability and is often configured to support serial processing tasks. A GPU typically includes many cores with limited cache memory and can handle processing of many threads, such as thousands of threads, in parallel. CPUs and GPUs often work together to handle processing operations, especially image rendering, such as image rendering enabled by 3D Digital Earth and GIS software.

Various embodiments include applying local terrain as a modification to a world-wide map at runtime, thereby reducing the preprocessing cost and sharing concerns associated with updating the entire world-wide map when compared with conventional rendering techniques and allowing rapid switching between versions of the localized terrain.

Various embodiments achieve such local terrain visualization by encoding localized terrain modifications into one or more heightmaps, which are used to modify the vertices of the world-wide terrain map at runtime using the GPU. Such modification may be conceptually similar to displacement mapping, a common technique in general 3D Computer Graphics, but the various embodiments are not to be confused with displacement mapping. Rather, the various embodiments utilize optimizations specific to 3D GIS to apply displacement to dynamic terrain surfaces at a global scale. As specific examples, the various embodiments enable the application of displacement to dynamic surfaces including time dynamic surfaces, animated surfaces, HLOD surfaces, and surfaces suitable for interactive user editing.

Figure 1:
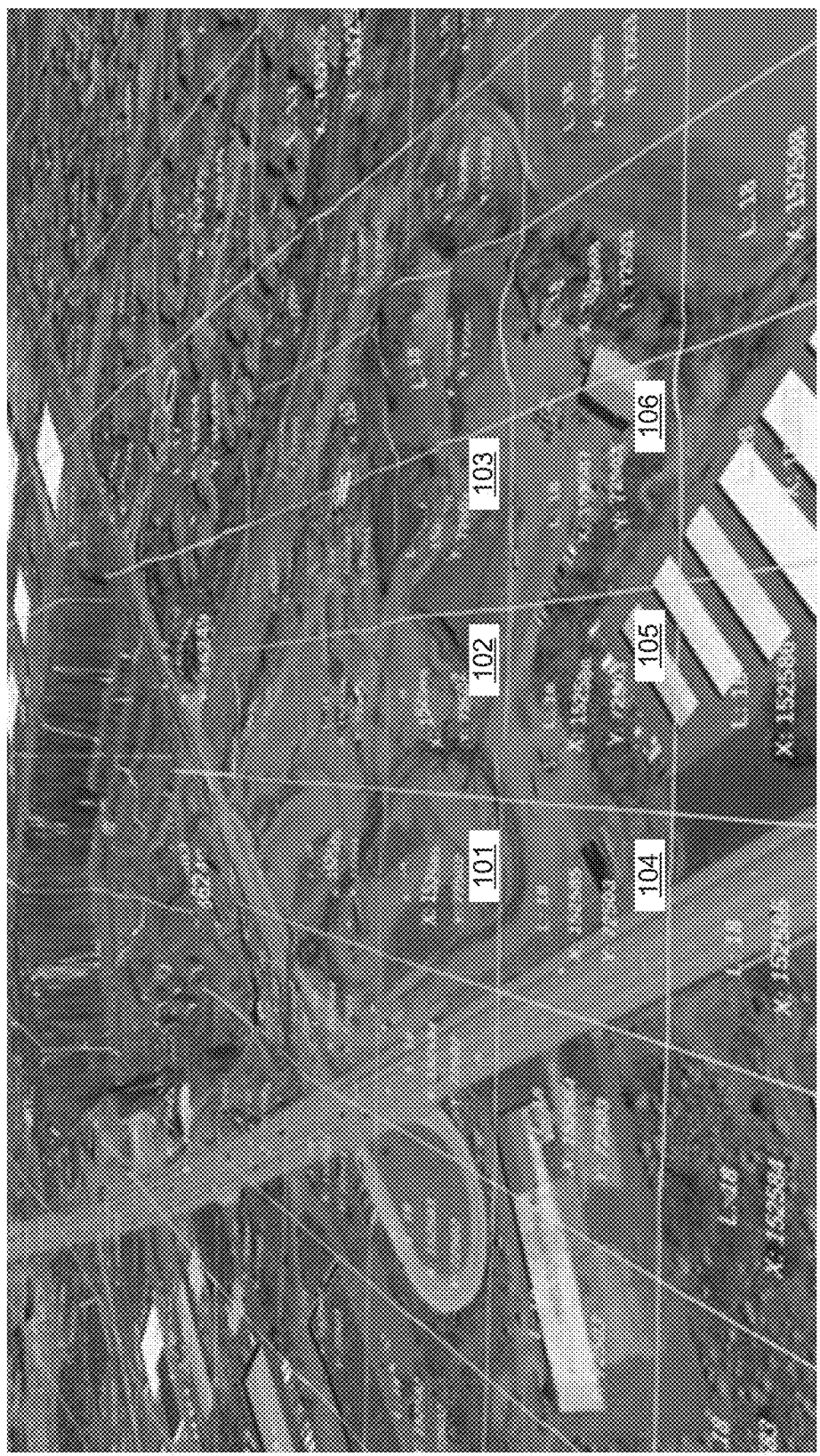
FIG. 1 illustrates a rendered portion of a base terrain map.

In various embodiments, a Digital Earth engine may render a base world-wide terrain map as a triangle mesh broken into tiles that cover known latitude and longitude defined rectangular areas and vertices that carry their height relative to a reference height source, such as an ellipsoid, in addition to the usual vertex attributes, such as vertex positions. FIG. 1 illustrates a rendered portion of a base terrain map 100. The base terrain map 100 may be an unmodified base terrain map. The base terrain map 100 may be a triangle mesh having series of base tiles. For example, base tiles 101, 102, 103, 104, 105, and 106 of the base terrain map 100 are highlighted in FIG. 1 out of the grid of all the base tiles shown in FIG. 1. Each base tile of the series of base tiles (e.g., base tiles 101, 102, 103, 104, 105, and 106) may correspond to its own latitude and longitude defined tile rectangular area as illustrated in FIG. 1. Each base tile of the series of base tiles (e.g., base tiles 101, 102, 103, 104, 105, and 106) may have vertices that define their respective heights relative to a reference height source, such as an ellipsoid.

Figure 2:
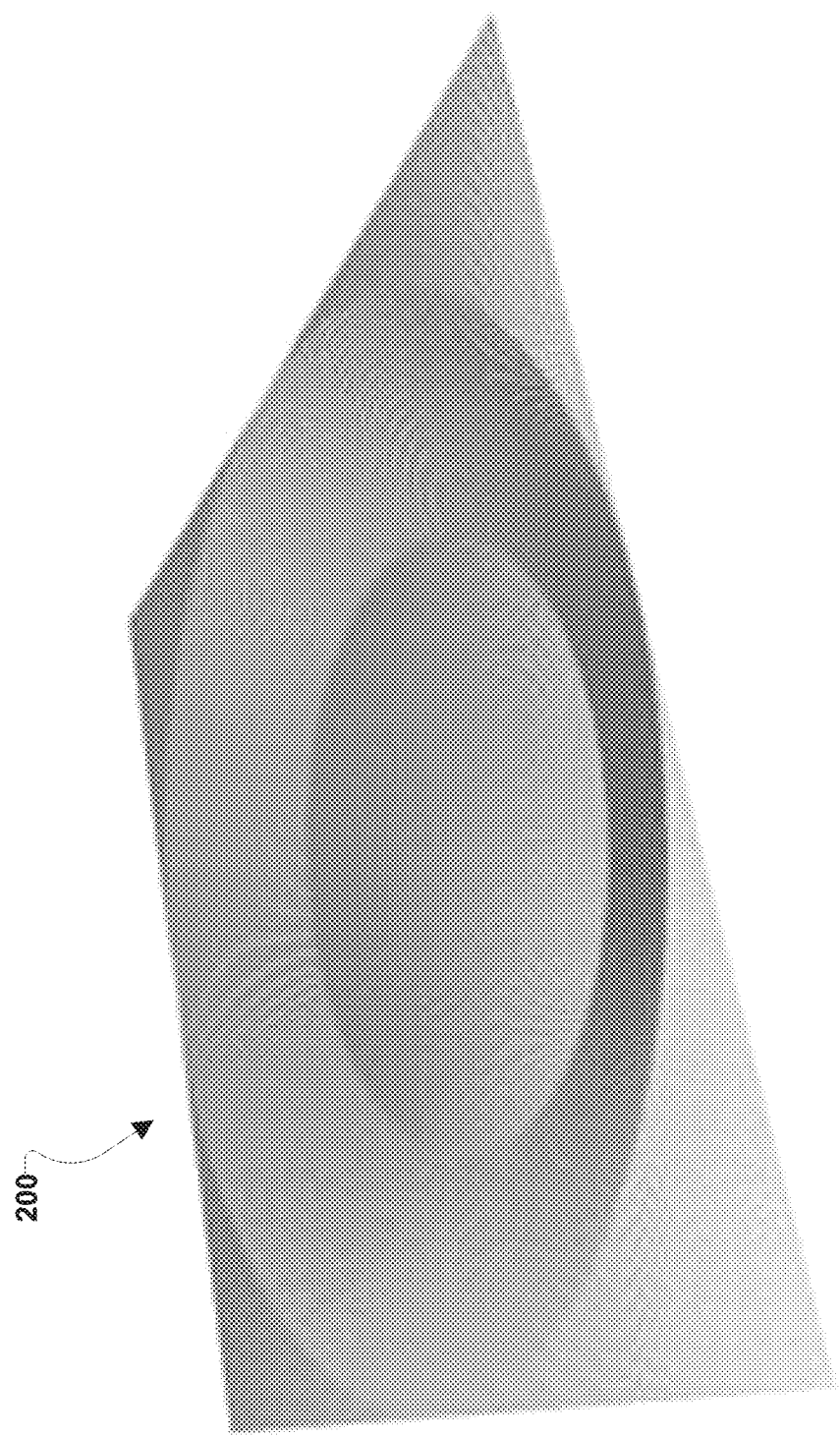
FIG. 2 illustrates a local terrain update according to various embodiments.
Figure 3:
FIG. 3 illustrates the local terrain update of FIG. 2 rendered with the base terrain map of FIG. 1.
Figure 4:
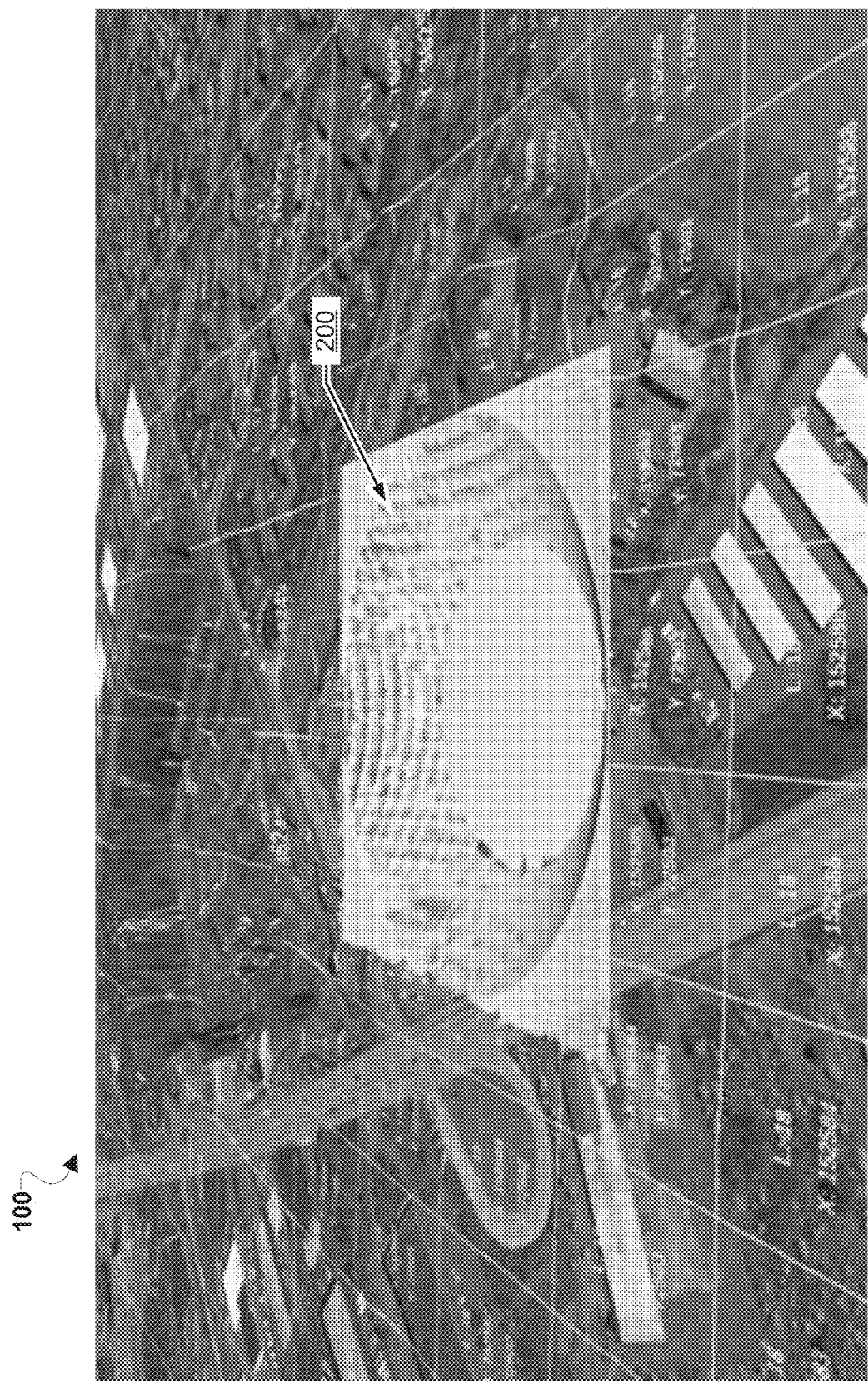
FIG. 4 illustrates the base terrain map of FIG. 1 modified by the local terrain update of FIG. 2 according to various embodiments.
Figure 5:
FIG. 5 illustrates modified terrain alone with the height changes from the local terrain update of FIG. 2 integrated into the base terrain map of FIG. 1 according to various embodiments.

In various embodiments, updated local terrain data may be provided as a series of height samples in a grid over a defined latitude and longitude rectangle. For example, FIG. 2 illustrates a local terrain update 200. The local terrain update 200 may be a series of height samples in a grid covering a local terrain tile that has a latitude and a longitude defining a rectangular area to be updated by the local terrain update 200. As a specific example, the local terrain update 200 may be a point cloud, such as a point cloud survey of an excavation of a quarry site at a latitude and longitude that falls on the base terrain map 100. FIG. 3 illustrates the local terrain update 200 rendered with the base terrain map 100. As the local terrain update 200 mostly represents lower heights than the surfaces of the base terrain map 100, merely rendering the local terrain update 200 and the base terrain map 100 together results in the local terrain update 200 being largely occluded by the original terrain of the base terrain map 100 as seen in FIG. 3. Thus, visualization of the changes made to the terrain reflected in the local terrain update 200, such as visualization of the digging resulting at a quarry site, is difficult to display in current systems. The various embodiments enable the visualization of the local terrain update 200 by modifying the base terrain map 100 at runtime. For example, FIG. 4 illustrates the base terrain map 100 modified by the local terrain update 200 according to various embodiments. FIG. 4 illustrates the base terrain map 100 containing gravel mounds at a quarry site modified using embodiment methods to match a point cloud survey containing an excavation that is the local terrain update 200. Similarly, FIG. 5 illustrates the modified terrain 500 alone with the height changes from the local terrain update 200 integrated into the base terrain map 100 and displayed at runtime according to various embodiments.

Figure 6:
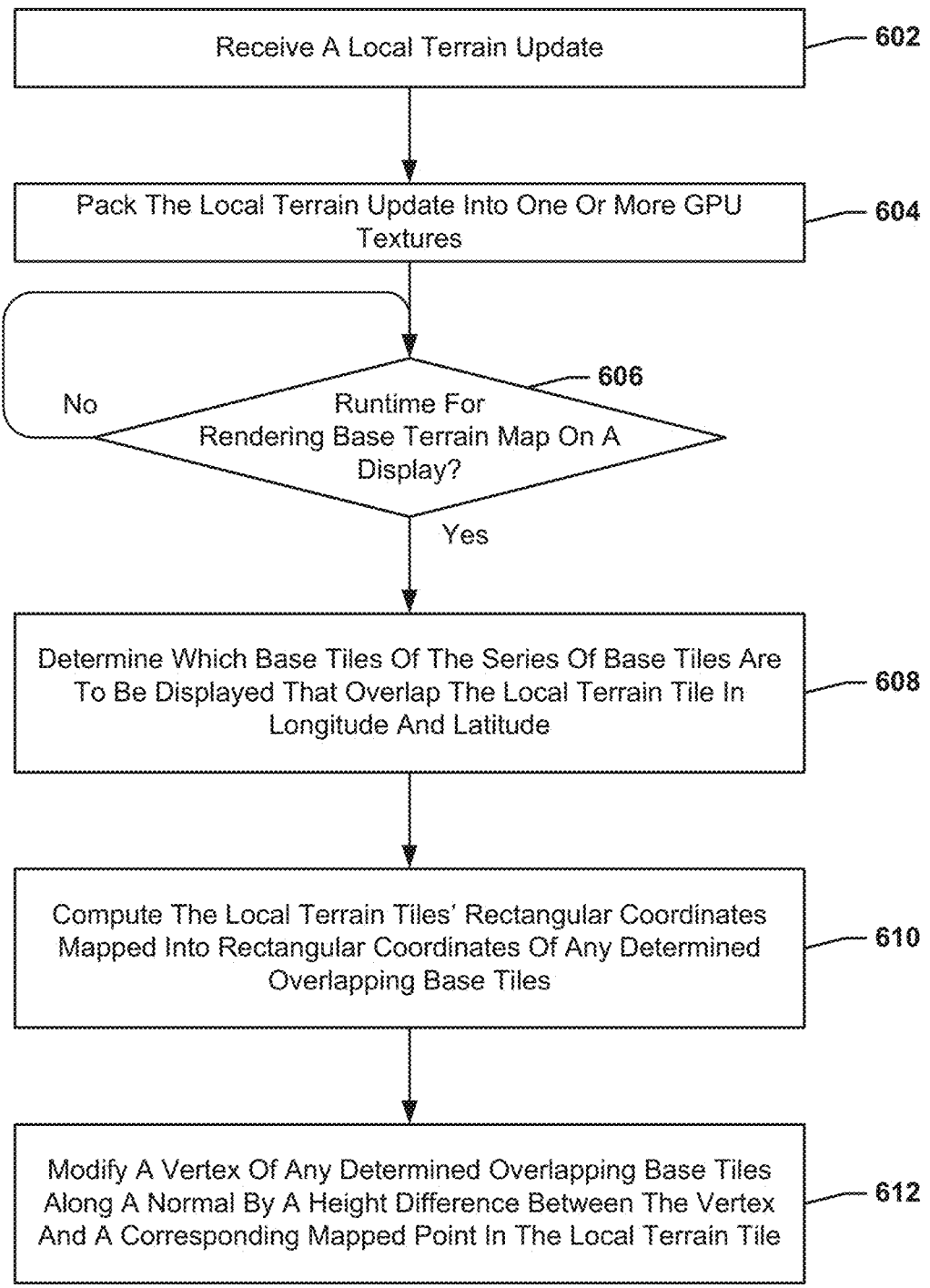
FIG. 6 is a process flow diagram illustrating an embodiment method for terrain modification at runtime for display of a base terrain map.

FIG. 6 is a process flow diagram illustrating an embodiment method 600 for terrain modification at runtime for display of a base terrain map. In various embodiments, the operations of method 600 may be performed by one or more component of a computing device individually and/or working together, such as a CPU, a GPU, etc.

The operations of method 600 may produce a terrain modification (e.g., the modified terrain 500 of FIG. 5) to a base terrain map (e.g., base terrain map 100 of FIG. 1) at runtime for rendering the base terrain map on a display of a computing device. The base terrain map may be a triangle mesh having a series of base tiles, each base tile of the series of base tiles corresponding to its own latitude and longitude defined tile rectangular area and each base tile of the series of base tiles having vertices that define their respective heights relative to a reference height source.

Figure 7:
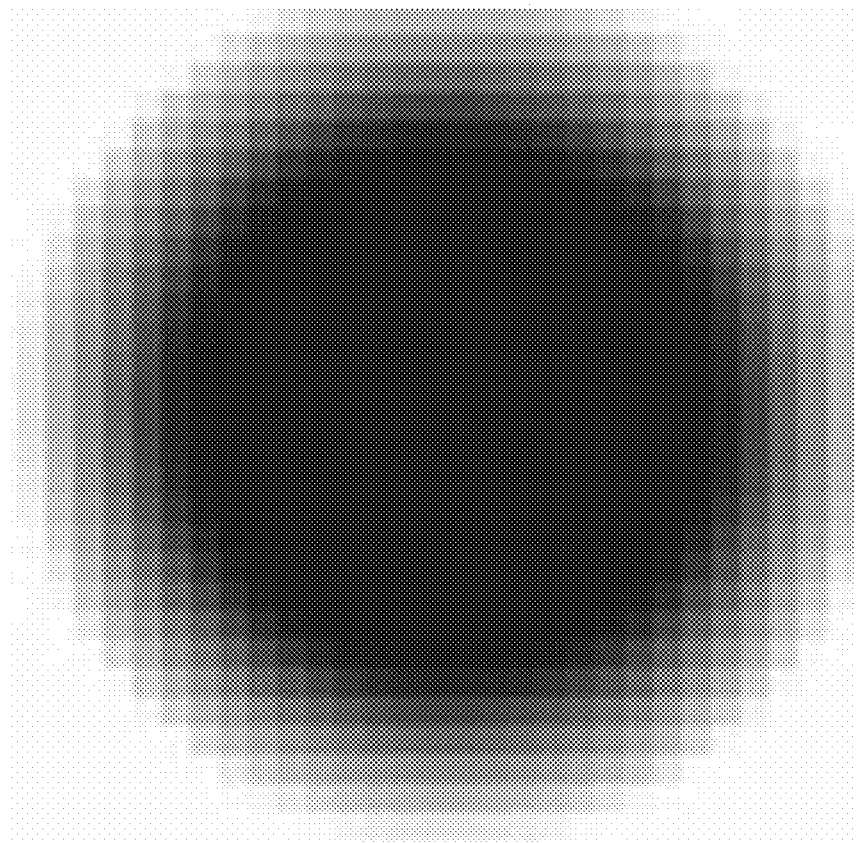
FIG. 7 illustrates an example height map of samples of the local terrain update of FIG. 2.

In block 602, the component of the computing device (e.g., the CPU and/or the GPU) may receiving a local terrain update (e.g., local terrain update 200 of FIG. 2). In various embodiments, the local terrain update may include a series of height samples in a grid covering a local terrain tile that has a latitude and a longitude defining a rectangular area to be updated by the local terrain update. For example, FIG. 7 illustrates a height samples in a heightmap 700 of the local terrain update 200. In FIG. 7, lighter values are closer to the maximum height and darker values are closer to the minimum height.

Referring back to FIG. 6, in block 604, the component of the computing device (e.g., the CPU and/or the GPU) may pack the local terrain update into one or more GPU textures, wherein each GPU texture covers a non-overlapping area of longitude and latitude. In various embodiments, the updated local terrain data may be packed into one or more GPU textures, each covering a nonoverlapping latitude/longitude area. This may include normalizing height values into the 0.0-1.0 range, from which the original height values can be unpacked in a shader on the GPU that has also been provided with the minimum and maximum height values in the original range. Packing to textures may involve quantization, for example depending on the precision requirements and target hardware of the application.

In determination block 606, the component of the computing device (e.g., the CPU and/or the GPU) may determine whether it is runtime for rendering the base terrain map on a display. In response to determining it is not runtime (i.e., determination block 606="No"), the component of the computing device may continue to monitor for runtime at determination block 606.

At runtime for rendering the base terrain map on a display (i.e., determination block 606="Yes"), the component of the computing device (e.g., the CPU and/or the GPU) may determine which base tiles of the series of base tiles are to be displayed and that overlap the local terrain tile in longitude and latitude in block 608.

In block 610, the component of the computing device (e.g., the CPU and/or the GPU) may compute the local terrain tiles' rectangular coordinates mapped into rectangular coordinates of any determined overlapping base tiles such that each GPU texture is mapped into a determined overlapping base tile.

In block 612, the component of the computing device (e.g., the CPU and/or the GPU) may modify a vertex of any determined overlapping base tiles along a normal by a height difference between the vertex and a corresponding mapped point in the local terrain tile.

The various operations performed in blocks 608, 610, and 612 may be better illustrated and understood with reference to FIGS. 8-12 and the following discussion.

Figure 8:
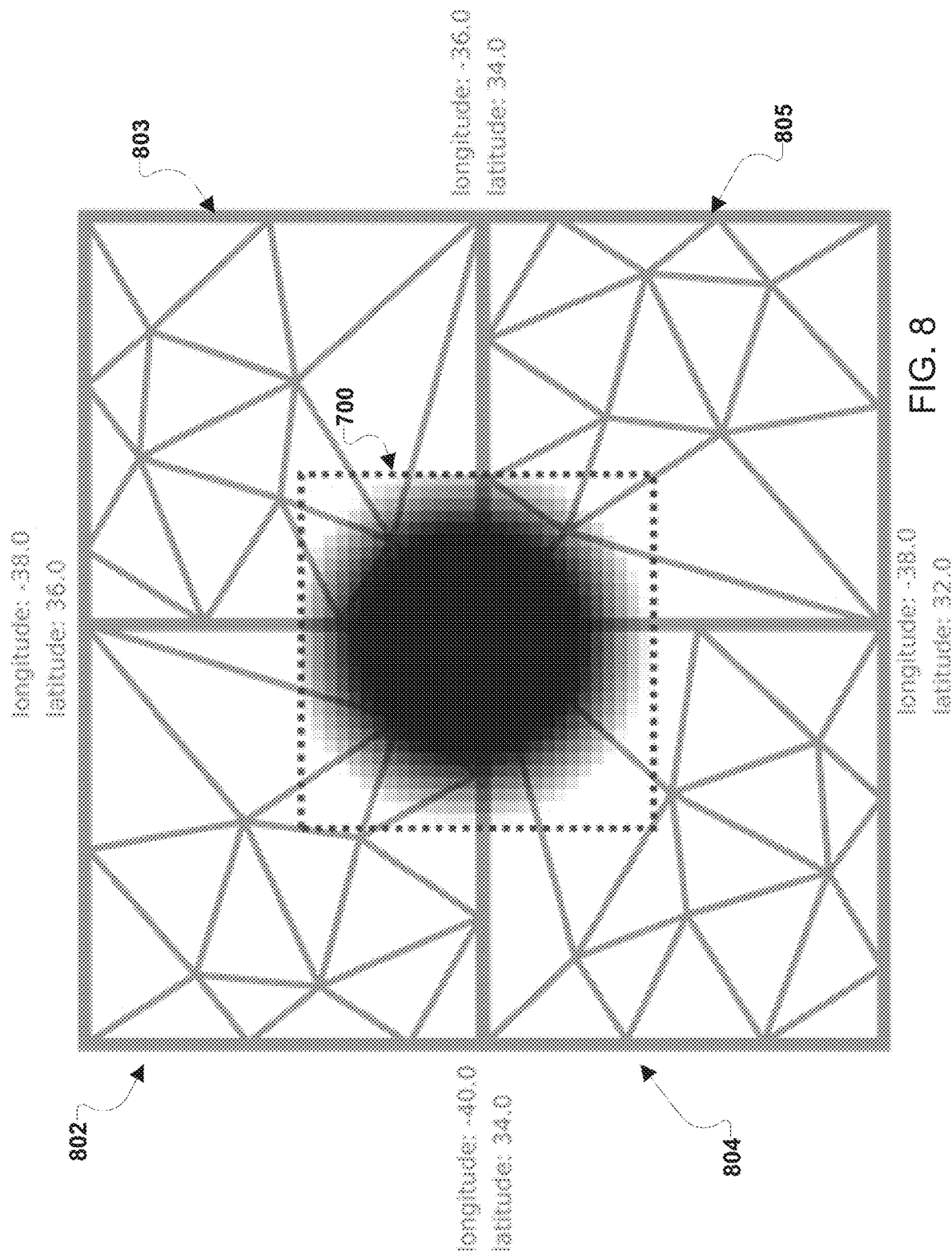
FIG. 8 illustrates terrain tiles overlapping with the heightmap of FIG. 2 in latitude/longitude space.

FIG. 8 illustrates terrain tiles 802, 803, 804, and 805, such as terrain tiles from the base terrain map 100, overlapping with the heightmap 700 in latitude/longitude space. For each base tile from the world-wide terrain map being rendered (e.g., base tiles 101, 102, 103, 104, 105, and 106 of the base terrain map 100), the updated terrain tiles from the updated local terrain data may be identified that the base terrain tile overlaps in latitude/longitude. For each overlap, each updated terrain tile's rectangle coordinates may be computed and mapped into the rectangle of the base terrain tile. Then, when rendering the base terrain tile, in the vertex a height may be looked up from a new terrain tile at the vertex's latitude/longitude location.

In various embodiments, texture sampling operations may be performed in tile-local space, as 32-bit floating point may be insufficient to precisely convey coordinates in coordinate systems that span larger areas, such as world-wide latitude and longitude in radians. Thus, the various embodiments differ from conventional displacement mapping, which can often use texture coordinates on the GPU directly that map directly to the correct coordinates in texture space due to lower precision requirements.

FIG. 9A illustrates a texture tile with coordinates mapped into the terrain tile of FIG. 8's texture coordinate space. The single latitude and longitude coordinate 900 is highlighted at a vertex location at which the terrain tile 802 overlaps the heightmap 700. FIG. 9B illustrates the UV space data in the tile and texture space for the single latitude and longitude coordinate 900. In various embodiments, texture sampling may be performed by mapping the texture tile's texture coordinates into the terrain tile's UV space so that texture coordinates in the terrain tile can be mapped into texture coordinates in the texture tile. This can be accomplished by computing the following parameters on a CPU in high precision (often 64 bit floating point):

[terrain tile width]=[terrain tile max longitude]−[terrain tile min longitude];
[terrain tile height]=[terrain tile max latitude]−[terrain tile min latitude];
[minimum u in tile]=([texture tile min longitude]−[terrain tile min longitude])/[terrain tile width];
[minimum v in tile]=([texture tile min latitude]−[terrain tile min latitude])/[terrain tile height];
[maximum u in tile]=([texture tile max longitude]−[terrain tile min longitude])/[terrain tile width]; and
[maximum v in tile]=([texture tile max latitude]−[terrain tile min latitude])/[terrain tile height].

These parameters are then used on the GPU for converting coordinates in the terrain tile's texture coordinate space into the texture tile's texture coordinate space:

[u in texture]=([u in tile]−[minimum u in tile])/([maximum u in tile]−[minimum u in tile]); and
[v in texture]=([v in tile]−[minimum v in tile])/([maximum v in tile]−[minimum v in tile]).

Figure 9:
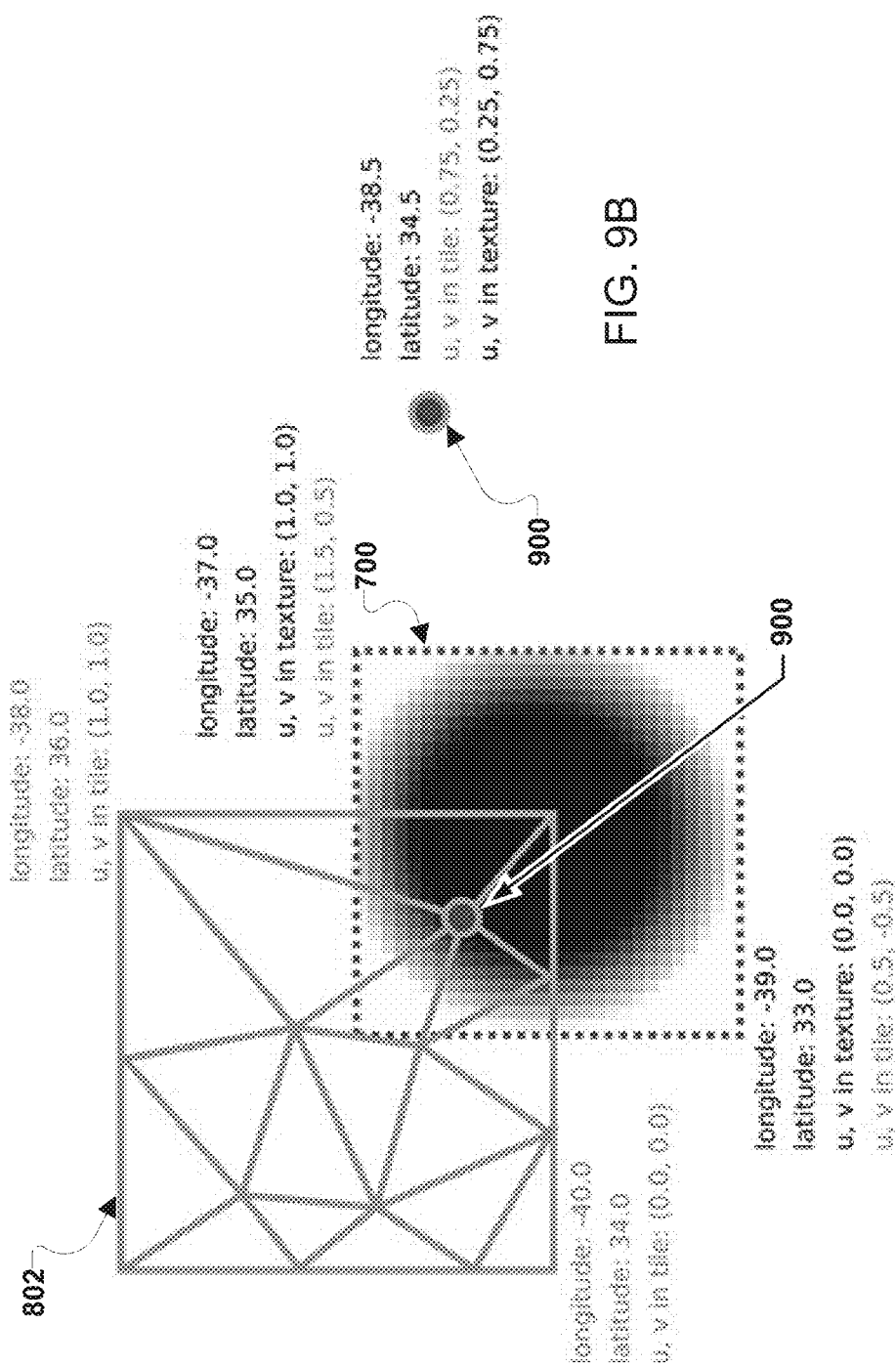
FIG. 9A illustrates a texture tile with coordinates mapped into the terrain tile of FIG. 8's texture coordinate space.
FIG. 9B illustrates the UV space data in the tile and texture space for a single latitude and longitude coordinate.

In the example illustrated in FIGS. 8-9B, these parameters are:

[terrain tile width]=[−38.0]−[−40.0]=2.0;
[terrain tile height]=[36.0]−[34.0]=2.0;
[minimum u in tile]=([−39.0]−[−40.0])/[2.0]=0.5;
[minimum v in tile]=([33.0]−[34.0])/[2.0]=−0.5;
[maximum u in tile]=([−37.0]−[−34.0])/[2.0]=1.5; and
[maximum v in tile]=([35.0]−[34.0])/[2.0]=0.5.

For the point represented by the longitude coordinate 900 indicated on the lower right of the terrain tile and the upper left of the texture:

[u in texture]=([0.75]−[0.5])/([1.5]−[0.5])=0.25; and
[v in texture]=([0.25]−[−0.5])/([0.5]−[−0.5])=0.75.

Figure 10:
FIGS. 10-12 illustrate embodiment methods for computing normals.
Figure 11:
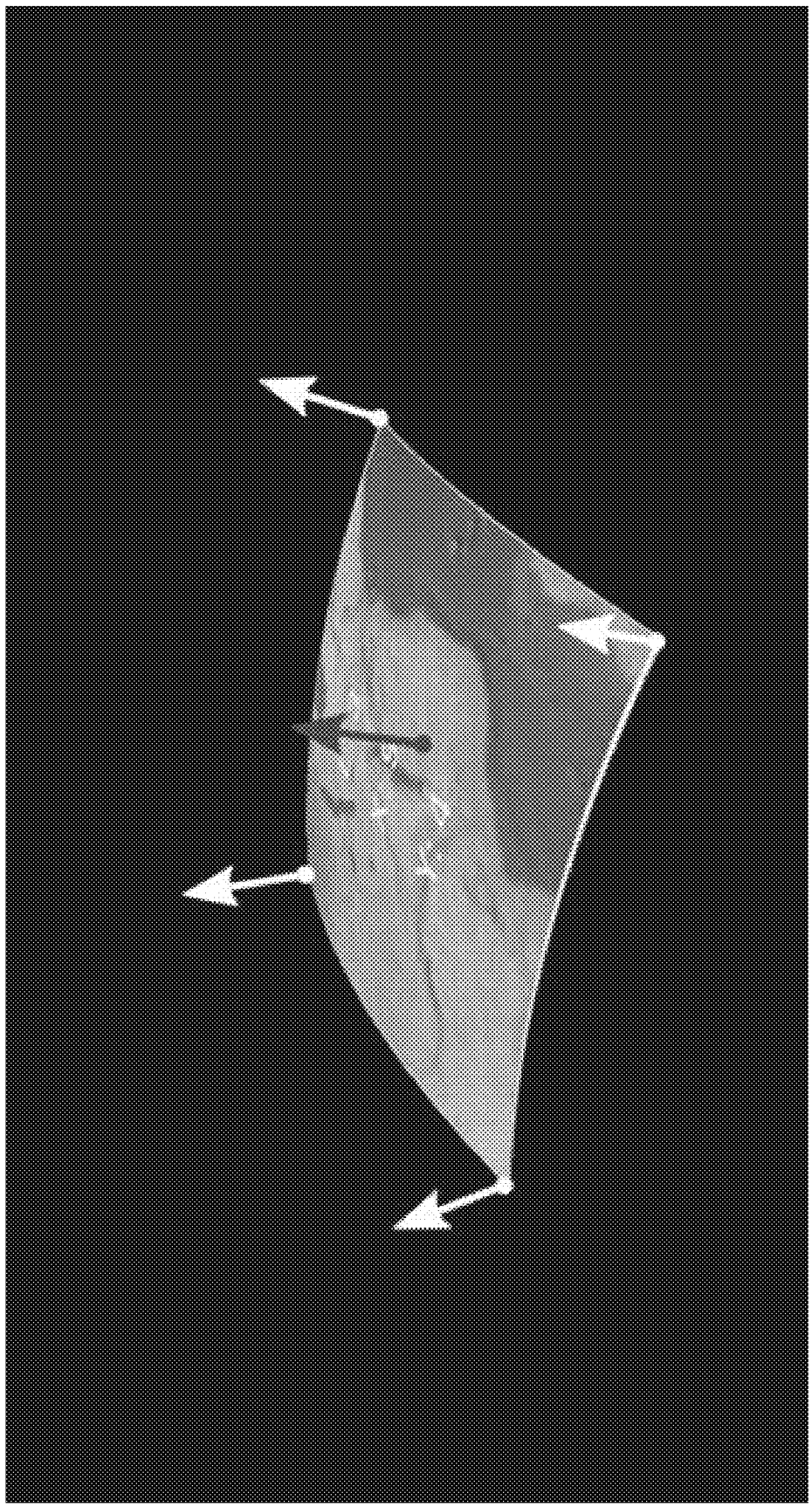
Figure 12:
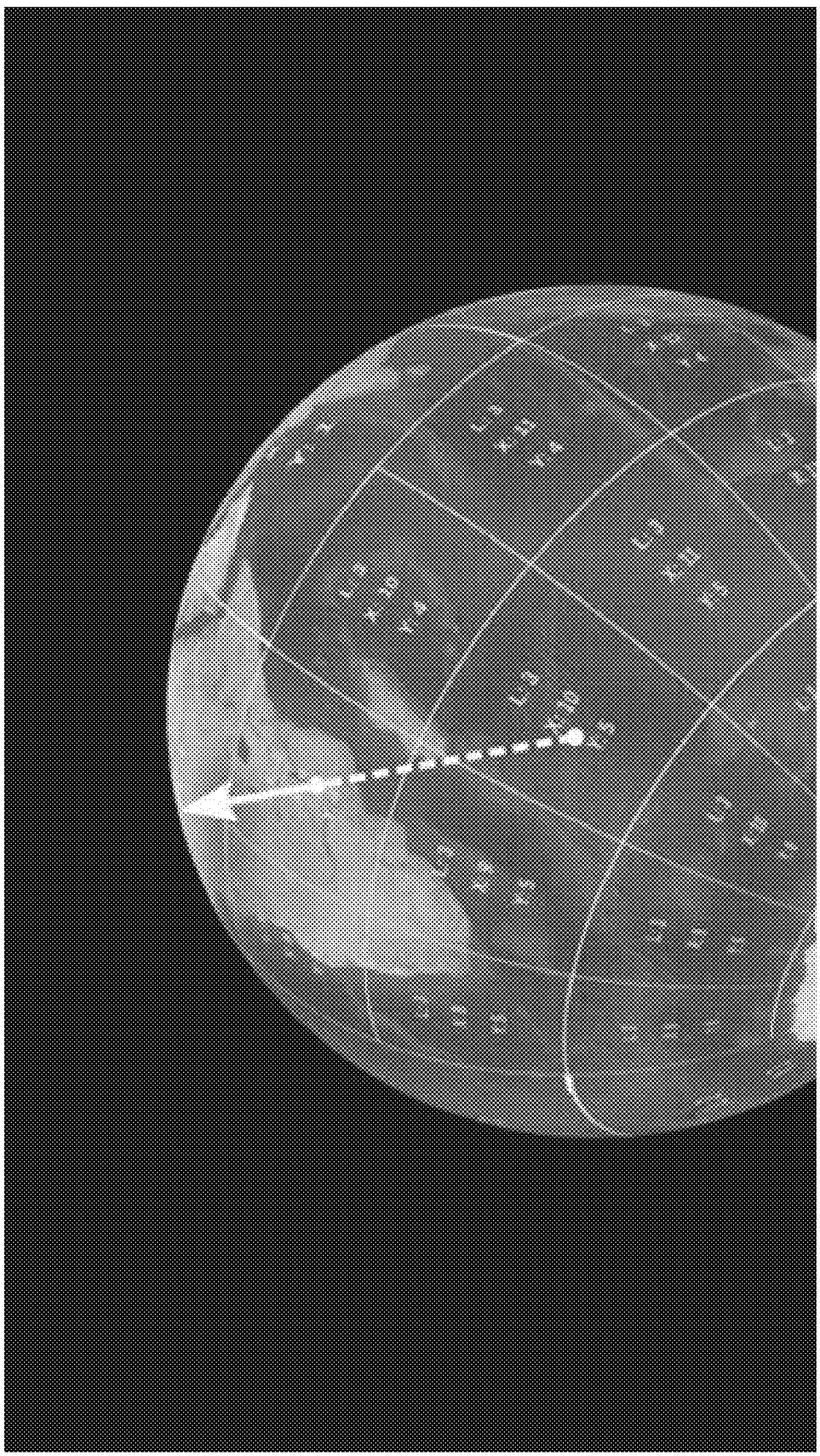

Various embodiments then compute a normal that approximately points "up" (i.e., away from a surface of the Earth) along or against which to push the vertex of the base terrain tile in accordance with the difference between its height (as a vertex attribute) and the height sampled from the new terrain tile. Unlike displacement mapping, which may utilize normals precomputed for each vertex, due to the ellipsoidal nature of the Earth, the normal used in the various embodiments may instead be computed in a variety of ways to save GPU memory, including: method 1) as an ellipsoid surface normal computed at the center of the new terrain data and transformed into eye space (i.e., relative to the camera) on the CPU for use on all vertices in modified in the vertex shader, regardless of their latitude/longitude; method 2) as an ellipsoid surface normal computed in the vertex shader by interpolating ellipsoid surface normals sampled at each of the corners of the base terrain tile and transformed into eye space (i.e., relative to the camera) on the CPU for use in the vertex shader; and method 3) as a vector approximating the ellipsoid surface normal at the vertex generated by normalizing the vector from the vertex's position to the center of the Earth. FIG. 10 illustrates the method 1) in which an ellipsoid normal is used from the center of the terrain (the light arrow) everywhere (the dark arrow). FIG. 11 illustrates the method 2) in which the normal (dark arrow) is interpolated based on the location in the terrain tile from normal at each corner of the tile (light arrows). FIG. 12 illustrates the method 3) of normalizing the vector from the center of the Earth (lower dot) through the terrain position at the vertex (upper dot).

The best choice of method for computing the normal according to various embodiments may depend on the size of the base terrain tile and/or the new terrain. For example, method 1) may be suitable for a base terrain tile no longer than a small distance, such as 1 kilometer on the longest side, while method 3) may be suitable for a base terrain tile covering more than a small latitude/longitude distance, such as a full degree of latitude or longitude, and method 2) may be suitable for all terrain tile sizes in between. Alternatively, method 1) may be suitable whenever the new terrain covers an area no larger than a small distance, such as 1 kilometer on the longest side.

Figure 13:
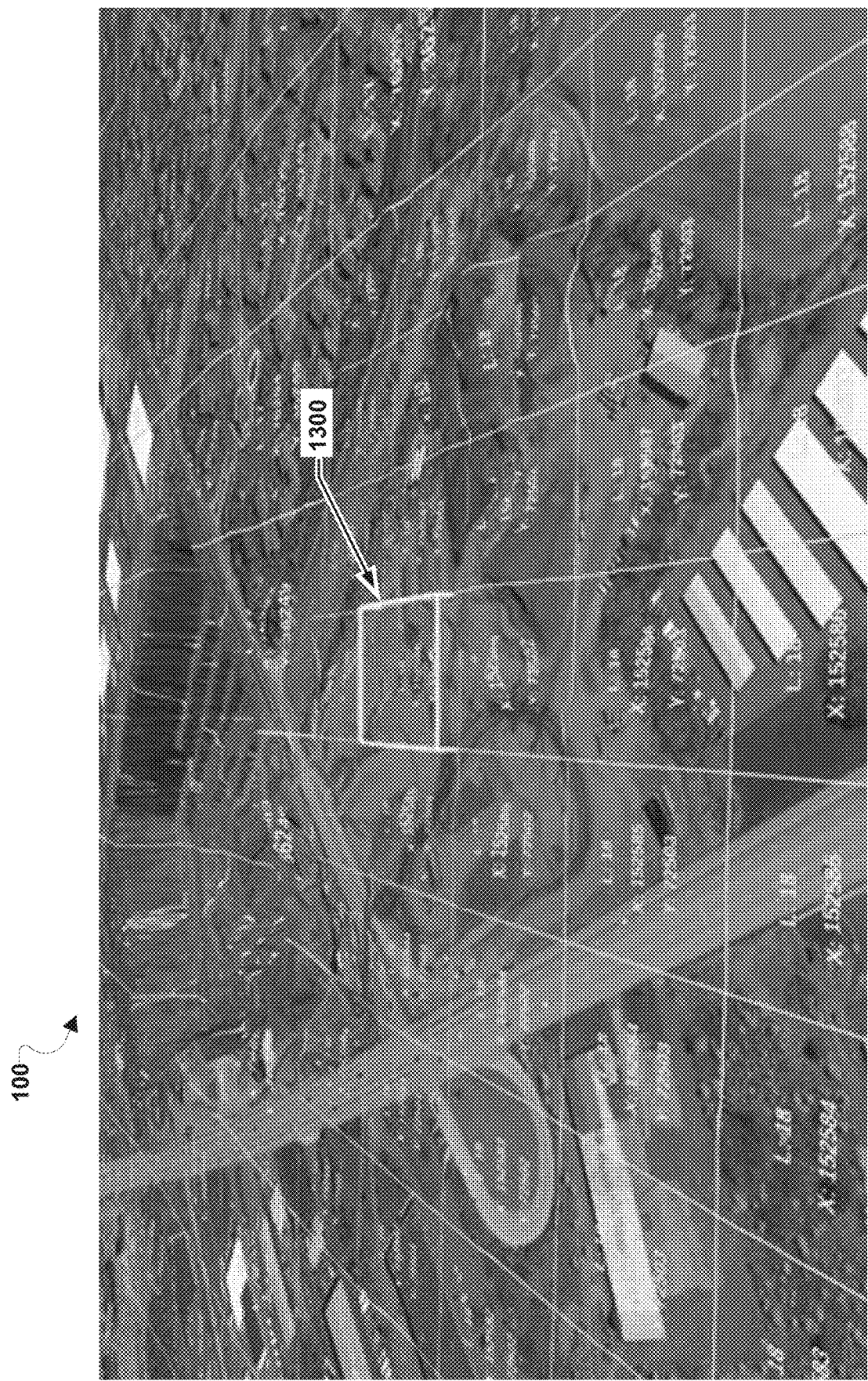
FIG. 13 illustrates bounding volumes for the base terrain map of FIG. 1.
Figure 14:
FIG. 14 illustrates an unmodified bounding volume over the modified terrain of FIG. 5.
Figure 15:
FIG. 15 illustrates a modified bounding volume over the modified terrain of FIG. 5.

In various embodiments, especially for Digital Earth systems that employ bounding volumes around terrain tiles for techniques such as view frustum culling, the bounding volumes may be modified to reflect the modified terrain geometry. FIG. 13 illustrates a bounding volume 1300 for the base terrain map 100 before various operations are performed to modify the terrain. Upon modifying the terrain, such as via the operations discussed above with reference to FIGS. 6-12, the terrain may be rendered as the modified terrain 500 as described above. However, as the terrain is modified (i.e., modified terrain 500), the bounding volume 1300 may be out of position (e.g., floating above the modified terrain 500). In various embodiments, bounding volume 1300 may be modified to a modified bounding volume 1301 to fit around the modified terrain tile as illustrated in FIG. 15.

Beyond just viewing modified world-wide terrain, the various embodiment methods may be useful for integrating fully 3D survey data, such as point clouds or photogrammetry, into world-wide terrain without the world-wide terrain clipping into the 3D survey data. This may be particularly useful for earthmoving and excavation workflows, and especially applications that require rapid switching when viewing data from multiple surveys over time. The various embodiments may also may be useful for interactive editing of terrain or surfaces that cut into terrain, as the heightmap may be updated on user interaction by swapping out textures or performing partial updates.

Figure 16:
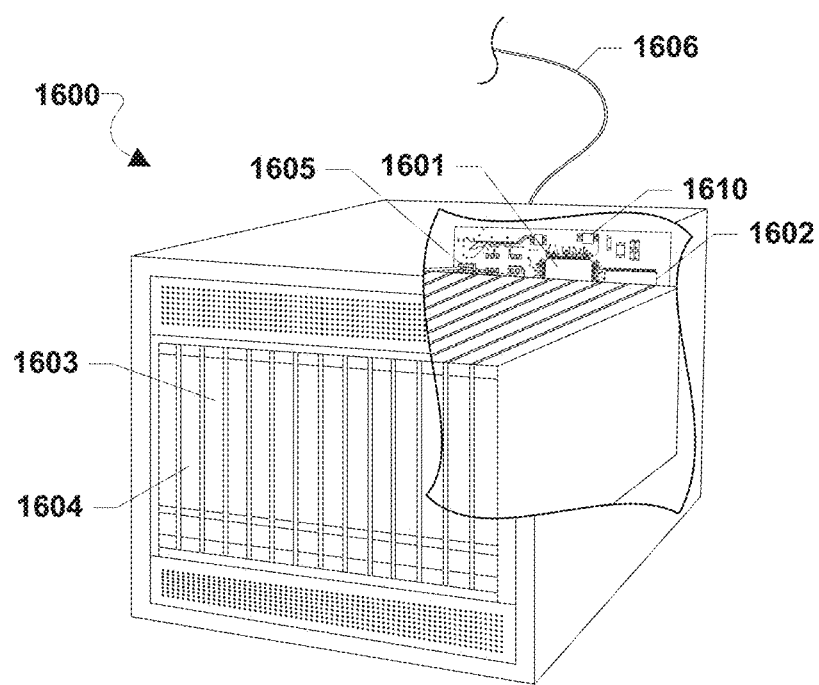
FIG. 16 is a component block diagram of a server that is a computing device suitable for use in the various embodiments.

The various embodiment methods may also be performed partially or completely on a variety of computing devices, such as a server. Such embodiments may be implemented on any of a variety of commercially available server devices, such as the server 1600 illustrated in FIG. 16. Such a server 1600 typically includes a one or more processors, such as a processor 1601 (e.g., a CPU) and a processor 1610 (e.g., a GPU), with one or more of the one or more processors coupled to internal memory 1602 (e.g., volatile memory) and a large capacity nonvolatile memory 1603, such as a disk drive. The one or more processors, such as a processor 1601 (e.g., a CPU) and a processor 1610 (e.g., a GPU), may be connected together and may exchange communications with one another. The server 1600 may also include a floppy disc drive, compact disc (CD) or DVD disc drive 1604 coupled to one or more of the one or more processors, such as a processor 1601 (e.g., a CPU) and a processor 1610 (e.g., a GPU). The server 1600 may also include network access ports 1605 coupled to one or more of the one or more processors, such as a processor 1601 (e.g., a CPU) and a processor 1610 (e.g., a GPU), for establishing data connections with a network 1606, such as a local area network coupled to other broadcast system computers and servers. The one or more processors, such as a processor 1601 (e.g., a CPU) and a processor 1610 (e.g., a GPU), may be any programmable microprocessor, microcomputer or multiple processor chip or chips that may be configured by software instructions (applications) to perform a variety of functions, including the functions of the various embodiments described above. Typically, software applications may be stored in the memory 1602, 1603 before they are accessed and loaded into one or more of the one or more processors, such as a processor 1601 (e.g., a CPU) and a processor 1610 (e.g., a GPU). The one or more processors, such as a processor 1601 (e.g., a CPU) and a processor 1610 (e.g., a GPU), may include internal memory sufficient to store the application software instructions.

Figure 17:
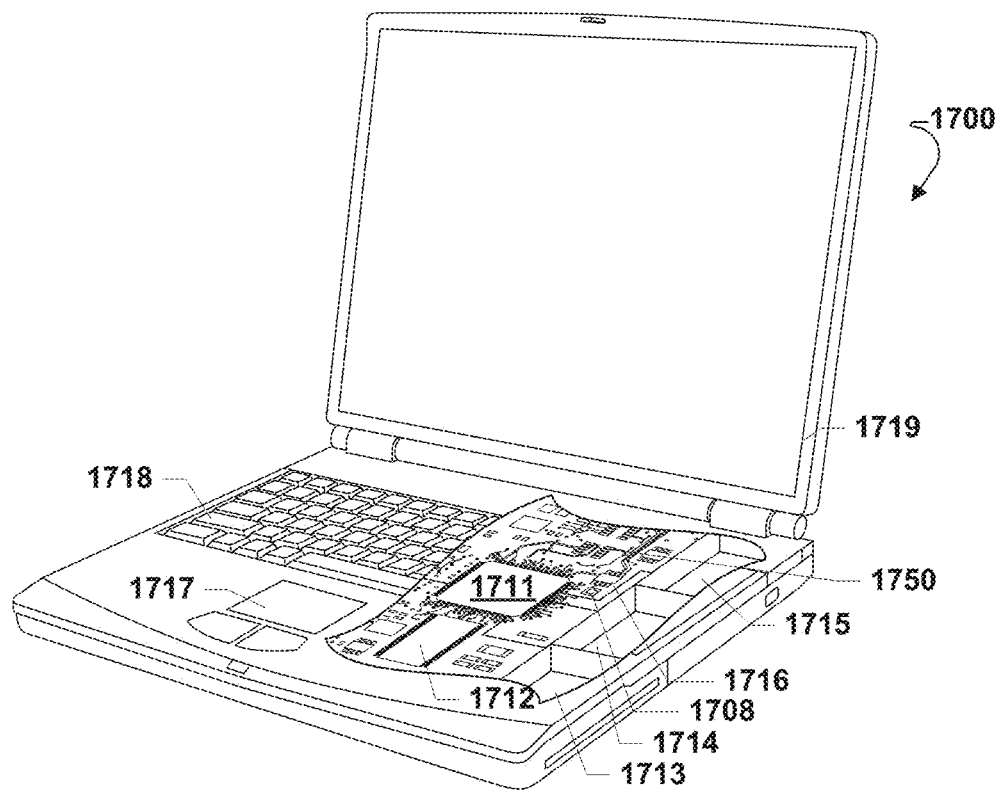
FIG. 17 is a component block diagram of a laptop that is a computing device suitable for use in the various embodiments.

The various embodiments described above may also be implemented within a variety of computing devices, such as a laptop computer 1700 illustrated in FIG. 17. Many laptop computers include a touchpad 1717 with touch surface that serves as the computer's pointing device, and thus may receive drag, scroll, and flick gestures similar to those implemented on mobile computing devices equipped with a touch screen display and described above. A laptop computer 1700 will typically include one or more processors, such as a processor 1711 (e.g., a CPU) and a processor 1750 (e.g., a GPU), and one or more of the one or more processors may be coupled to volatile memory 1712 and a large capacity nonvolatile memory, such as a disk drive 1713 of Flash memory. One or more of the one or more processors, such as a processor 1711 (e.g., a CPU) and a processor 1750 (e.g., a GPU), may be connected together and may exchange communications with one another. Additionally, the laptop computer 1700 may have one or more antennas 1708 for sending and receiving electromagnetic radiation that may be connected to a wireless data link and/or cellular telephone transceiver 1716 coupled to one or more of the one or more processors, such as a processor 1711 (e.g., a CPU) and a processor 1750 (e.g., a GPU). The laptop computer 1700 may also include a floppy disc drive 1714 and a compact disc (CD) drive 1715 coupled to one or more of the one or more processors, such as a processor 1711 (e.g., a CPU) and a processor 1750 (e.g., a GPU). In a notebook configuration, the computer housing includes the touchpad 1717, the keyboard 1718, and the display 1719 all coupled to one or more of the one or more processors, such as a processor 1711 (e.g., a CPU) and a processor 1750 (e.g., a GPU). Other configurations of the mobile computing device may include a computer mouse or trackball coupled to one or more of the one or more processors, such as a processor 1711 (e.g., a CPU) and a processor 1750 (e.g., a GPU), (e.g., via a USB input) as are well known, which may also be used in conjunction with the various embodiments.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are used interchangeably herein and are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for terrain modification at runtime for display of a base terrain map, wherein the base terrain map is a triangle mesh having a series of base tiles, each base tile of the series of base tiles corresponding to its own latitude and longitude defined tile rectangular area and each base tile of the series of base tiles having vertices that define their respective heights relative to a reference height source, the method comprising:
  receiving a local terrain update, wherein the local terrain update comprises a series of height samples in a grid covering a local terrain tile that has a latitude and a longitude defining a rectangular area to be updated by the local terrain update;
  packing the local terrain update into one or more graphics processing unit (GPU) textures, wherein each GPU texture covers a non-overlapping area of longitude and latitude; and
  at runtime for rendering the base terrain map on a display:
    determining which base tiles of the series of base tiles are to be displayed and that overlap the local terrain tile in longitude and latitude;
    computing the local terrain tiles' rectangular coordinates mapped into rectangular coordinates of any determined overlapping base tiles such that each GPU texture is mapped into a determined overlapping base tile, wherein computing the local terrain tiles' rectangular coordinates mapped into rectangular coordinates of any determined overlapping base tiles such that each GPU texture is mapped into a determined overlapping base tile comprises:
      determining by a central processing unit (CPU) minimum and maximum u and v parameters for any determined overlapping base tiles; and
      passing the determined minimum and maximum u and v parameters from the CPU to a GPU for use in mapping each GPU texture into a determined overlapping base tile; and
    modifying a vertex of any determined overlapping base tiles along a normal by a height difference between the vertex and a corresponding mapped point in the local terrain tile, wherein the determining, computing, and modifying are performed in tile local space.

2. The method of claim 1, wherein the local terrain update is a point cloud.

3. The method of claim 1, wherein the normal is:
an ellipsoid surface normal from a center of the local terrain update;
an interpolated normal based on normal at the corner the local terrain update; or
a normalized vector from the center of the Earth.

4. The method of claim 1, further comprising modifying a bounding volume to fit around the modified overlapping base tiles.

5. A computing device, comprising:
a graphics processing unit (GPU); and
a central processing unit (CPU) configured with processor-executable instructions to perform operations comprising:
receiving a local terrain update, wherein the local terrain update comprises a series of height samples in a grid covering a local terrain tile that has a latitude and a longitude defining a rectangular area to be updated by the local terrain update;
packing the local terrain update into one or more GPU textures, wherein each GPU texture covers a non-overlapping area of longitude and latitude; and
at runtime for rendering a base terrain map on a display, wherein the base terrain map is a triangle mesh having a series of base tiles, each base tile of the series of base tiles corresponding to its own latitude and longitude defined tile rectangular area and each base tile of the series of base tiles having vertices that define their respective heights relative to a reference height source:
determining which base tiles of the series of base tiles are to be displayed and that overlap the local terrain tile in longitude and latitude;
computing the local terrain tiles' rectangular coordinates mapped into rectangular coordinates of any determined overlapping base tiles such that each GPU texture is mapped into a determined overlapping base tile, wherein computing the local terrain tiles' rectangular coordinates mapped into rectangular coordinates of any determined overlapping base tiles such that each GPU texture is mapped into a determined overlapping base tile comprises:
determining minimum and maximum u and v parameters for any determined overlapping base tiles; and
passing the determined minimum and maximum u and v parameters from the CPU to the GPU for use in mapping each GPU texture into a determined overlapping base tile; and
modifying a vertex of any determined overlapping base tiles along a normal by a height difference between the vertex and a corresponding mapped point in the local terrain tile, wherein the determining, computing, and modifying are performed in tile local space.

6. The computing device of claim 5, wherein the local terrain update is a point cloud.

7. The computing device of claim 5, wherein the CPU is configured with processor-executable instructions to perform operations such that the normal is:
an ellipsoid surface normal from a center of the local terrain update;
an interpolated normal based on normal at the corner the local terrain update; or
a normalized vector from the center of the Earth.

8. The computing device of claim 5, wherein the CPU is configured with processor-executable instructions to perform operations further comprising modifying a bounding volume to fit around the modified overlapping base tiles.

9. A non-transitory processor readable medium having processor executable instructions stored thereon configured to cause a central processing unit (CPU) to perform operations comprising:
receiving a local terrain update, wherein the local terrain update comprises a series of height samples in a grid covering a local terrain tile that has a latitude and a longitude defining a rectangular area to be updated by the local terrain update;
packing the local terrain update into one or more graphics processing unit (GPU) textures, wherein each GPU texture covers a non-overlapping area of longitude and latitude; and
at runtime for rendering a base terrain map on a display, wherein the base terrain map is a triangle mesh having a series of base tiles, each base tile of the series of base tiles corresponding to its own latitude and longitude defined tile rectangular area and each base tile of the series of base tiles having vertices that define their respective heights relative to a reference height source:
determining which base tiles of the series of base tiles are to be displayed and that overlap the local terrain tile in longitude and latitude;
computing the local terrain tiles' rectangular coordinates mapped into rectangular coordinates of any determined overlapping base tiles such that each GPU texture is mapped into a determined overlapping base tile, wherein computing the local terrain tiles' rectangular coordinates mapped into rectangular coordinates of any determined overlapping base tiles such that each GPU texture is mapped into a determined overlapping base tile comprises:
determining minimum and maximum u and v parameters for any determined overlapping base tiles; and
passing the determined minimum and maximum u and v parameters to a GPU for use in mapping each GPU texture into a determined overlapping base tile; and
modifying a vertex of any determined overlapping base tiles along a normal by a height difference between the vertex and a corresponding mapped point in the local terrain tile.

10. The non-transitory processor readable medium of claim 9, wherein the processor executable instructions are configured to cause a CPU to perform operations such that the local terrain update is a point cloud.

11. The non-transitory processor readable medium of claim 9, wherein the processor executable instructions are configured to cause a CPU to perform operations such that the normal is:
an ellipsoid surface normal from a center of the local terrain update;
an interpolated normal based on normal at the corner the local terrain update; or
a normalized vector from the center of the Earth.

12. The non-transitory processor readable medium of claim 9, wherein the processor executable instructions are configured to cause a CPU to perform operations further comprising modifying a bounding volume to fit around the modified overlapping base tiles.

* * * * *